(12) United States Patent
Colby

(10) Patent No.: US 8,454,209 B2
(45) Date of Patent: Jun. 4, 2013

(54) SOLAR LIGHT WITH CENTERING HOOK

(76) Inventor: Rory Gene Colby, Perry, MI (US)

( * ) Notice: Subject to any disclaimer, the term of this patent is extended or adjusted under 35 U.S.C. 154(b) by 175 days.

(21) Appl. No.: 13/209,044

(22) Filed: Aug. 12, 2011

(65) Prior Publication Data

US 2013/0039045 A1 Feb. 14, 2013

(51) Int. Cl.
*F21S 8/06* (2006.01)

(52) U.S. Cl.
USPC ............................ 362/406; 362/183; 362/805

(58) Field of Classification Search
USPC ................. 362/122, 183, 276, 404–408, 802, 362/805–806
See application file for complete search history.

(56) References Cited

U.S. PATENT DOCUMENTS 5,860,248 A * 1/1999 Peters ............................... 47/67

* cited by examiner

*Primary Examiner* — Jason Moon Han

(57) ABSTRACT

A hanging basket lighting system is disclosed. The system may include a light source and a clip device attachable to the light source providing a manner to hang the light source over a basket so as to shine unobstructed light on the contents of the basket. Additionally, the light source may be solar powered providing an energy conserving mechanism for illuminating the contents of hanging baskets at night.

4 Claims, 2 Drawing Sheets

SOLAR LIGHT WITH CENTERING HOOK

BACKGROUND OF THE INVENTION

The present invention generally relates to lighting systems, and more particularly, to a solar light with a centering hook.

Some homeowners enjoy enhancing the look of their home by using hanging baskets to hold and display items such as plants outdoors. Some items may look particularly impressive and may enhance the appearance of a home when they are highlighted during the evening hours with a spot light.

Some current systems use wall mounted lamps directed to shine on one or more baskets. While providing a flood effect around the basket, the basket itself may partially obstruct the light source causing undesirable shadowing. Other systems may use a conventional copper hardwired incandescent bulb hung chandelier style above the basket. The wiring may be snaked through hanging support cables causing the bulb to hang at uneven angles which may also promote undesirable shadowing. Hardwired systems may also increase power usage costs for the homeowner.

As can be seen, there is a need for an improved lighting system on hanging baskets that also promotes energy conservation.

SUMMARY OF THE INVENTION

In one aspect of the present invention, a basket lighting system for a hanging basket including a plurality of support hangers extending from an apex downward to the basket comprises a light bulb including an end cap, the end cap including a through hole; a retainer ring attached to the end cap; and a loop including a perimeter and an opening in the perimeter, the loop adapted to slip around the plurality of support hangers, the loop further including a hook extending from the perimeter connected to the retainer ring and adapted to carry the light bulb centered under the apex.

In another aspect of the present invention, a lighting system includes a solar powered light source; and a circular clip attached to an end of the light source adapted to hold the light source centered within the clip.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims. Various inventive features are described below that can each be used independently of one another or in combination with other features.

Broadly, embodiments of the present invention generally provide an apparatus providing a directed and unobstructed illumination of objects in a hanging basket. In one aspect, a light source may be attached to shine downward from support cables. In another aspect, an attachment device is adapted to centralize the light source over contents of the basket, providing a uniform illumination while drawing power from ambient light.

Figure 1:
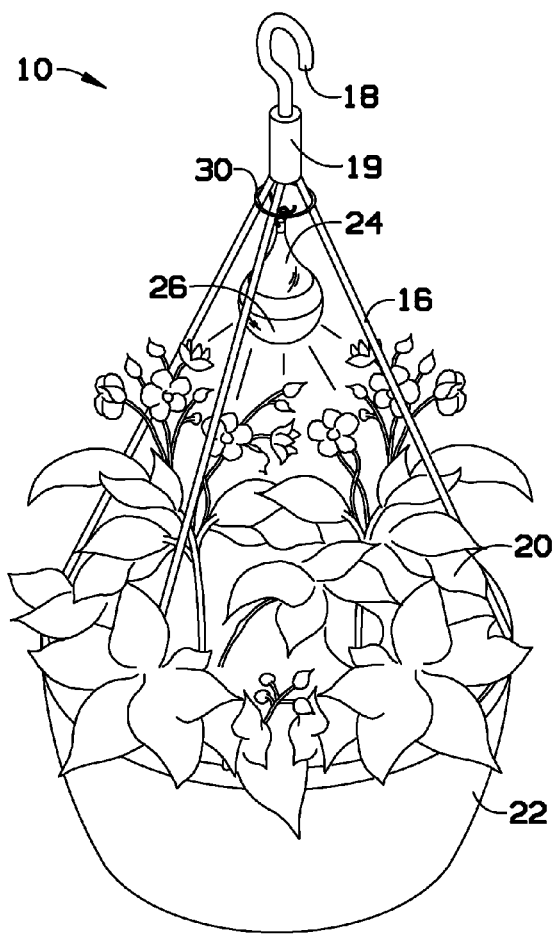
FIG. 1 is a perspective view of a lighting system in use according to an exemplary embodiment of the present invention.
Figure 2:
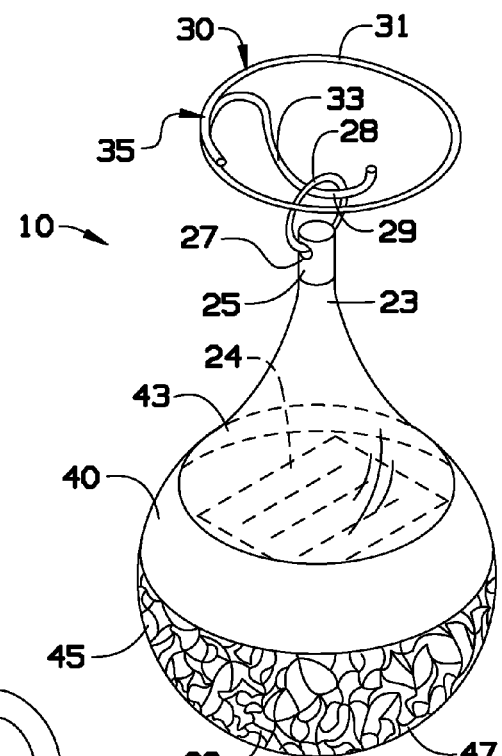
FIG. 2 is a perspective view of the lighting system of FIG. 1.
Figure 3:
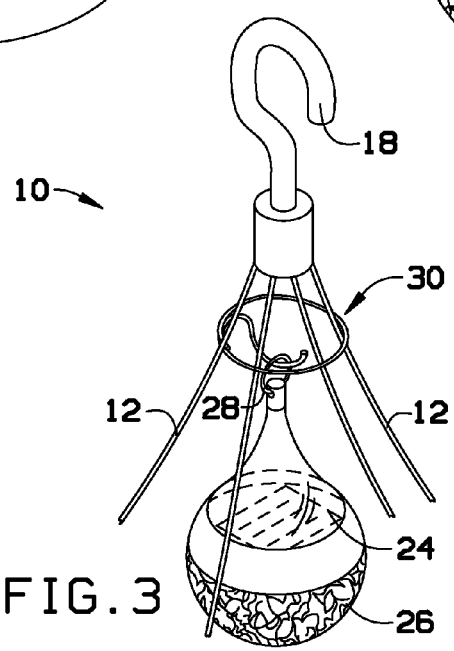
FIG. 3 is a partial top perspective view of the lighting system of FIG. 1.
Figure 4:
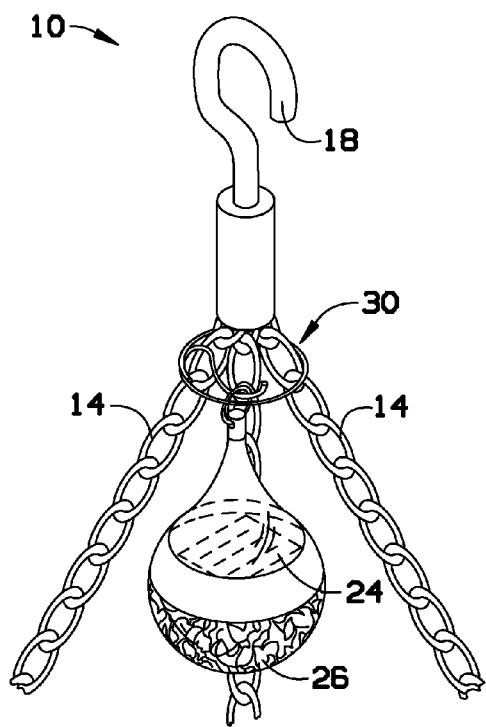
FIG. 4 is a partial top perspective view of the lighting system of FIG. 1 attached to chain-linked cables.
Figure 5:
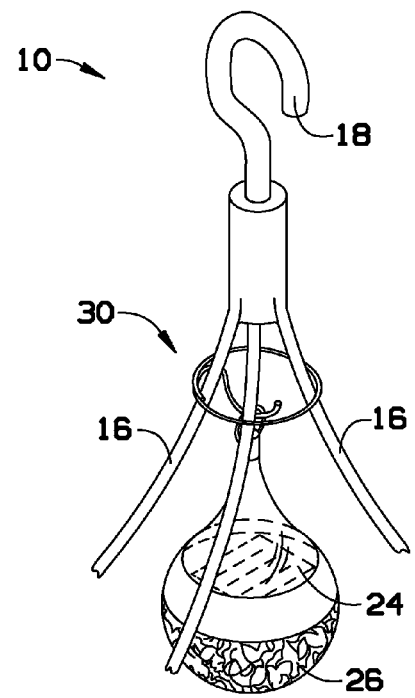
FIG. 5 is a partial top perspective view of the lighting system of FIG. 1 attached to plastic cables.
Figure 6:
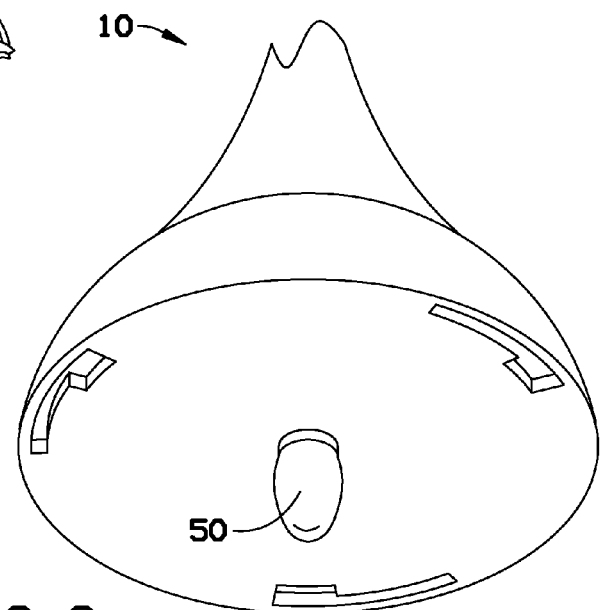
FIG. 6 is a bottom view of a light emitting diode used in an exemplary embodiment of the lighting system of FIG. 1.

Referring to FIGS. 1-6, a lighting system 10 is shown according to an exemplary embodiment of the present invention. The lighting system 10 includes a light source 26 and a clip 30. The lighting system 10 may be, for example, used on hanging baskets 22 that include a plurality of support hangers 12;14;16 attached at an apex 19 of a basket hook 18. The hanging basket 22 may hold a variety of contents 20 that may include, for example, plants. FIGS. 3-5 are similar to one another except that the support hangers 12;14;16 are made from different materials, illustrating the versatility of an aspect of the invention. Support hangers 12 may be wire cables. Support hangers 14 may be chain links. Support hangers 16 may be plastic strands. It will be understood that in the remainder of the disclosure, any reference to a support hanger 12 may also be understood as referring to support hangers 14 or 16.

Referring now to FIGS. 1-3 and 6, the light source 26 may be a light bulb. The light bulb may include an upper housing section 43 and a lower housing section 45.

The lower housing section 43 may include an illuminating device 50, for example, a light emitting diode (FIG. 6) disposed to shine downward toward the contents 20 when attached to the support hangers 12. The illuminating device 50 may be obstructed from view by a band 40. The lower housing section 45 may also include optical features 47 configured to distort light. For example, the optical features 47 may include a crushed glass pattern.

In one aspect, the light source 26 may be solar powered and include a solar cell 24 powering illumination. The upper housing section 43 may be transparent or translucent. The solar cell 24 may be disposed to face upward in the bulb, capturing light from above the light source 26 through the housing section 43. The upper housing section 43 may include a stem end 23 covered by an end cap 25. A retainer ring 28 may be attached to the end cap 25 via a through hole 27.

In one aspect, the clip 30 may be attached to the stem end 23 in such a manner as to center the light source 26 within the clip 30. For example, the clip 30 may be a wire body configured into a circular loop 31. The loop 31 may partially overlap at a junction 35. A clip hook 33 may be configured by bending a portion of the wire body to extend inward toward the center from the loop perimeter. The clip hook 33 may include a nadir 29 that is disposed approximately centered within the loop 31.

In one exemplary embodiment, the clip 30 may be slipped over each one of the support cables 12 and mounted so that the loop 31 is disposed planar to the apex 19. The light source 26 may be attached to the clip 30 via the retainer ring 28 so that when hung, the retainer ring 28 rests on the nadir 29 so that the light source 26 hangs centered within the opening of the loop 31 under the apex 19. The solar cell 24 may be exposed to overhead natural light during the day while the light source is also in position to shine down on an area under the basket hook 18. Thus, unobstructed light may shine down onto the contents 20 of the hanging basket 22 during the evening providing a dramatic effect on the illuminated contents 20.

It should be understood, of course, that the foregoing relates to exemplary embodiments of the invention and that modifications may be made without departing from the spirit and scope of the invention as set forth in the following claims. For example, other exemplary embodiments may forgo the use of an end cap and provide a retainer ring integrated as part of the upper housing section 43. Nonetheless, the clip 30 may provide a device adapted to dispose the light source 26 to shine unobstructed down onto a hanging basket.

What is claimed is:

1. A basket lighting system for a hanging basket including a plurality of support hangers extending from an apex downward to the basket, comprising:
   a light bulb including a solar cell configured to provide power and an end cap including a through hole;
   a retainer ring attached to the end cap; and
   a loop including a perimeter and an opening in the perimeter, the loop adapted to slip around the plurality of support hangers, the loop further including a hook extending from the perimeter connected to the retainer ring and adapted to carry the light bulb centered under the apex.

2. The basket lighting system of claim 1, wherein the loop is disposed planar to the apex.

3. The basket lighting system of claim 1, wherein the hook is centered from the perimeter of the loop.

4. The basket lighting system of claim 3, wherein the retainer ring hangs from a nadir of the hook.

* * * * *